United States Patent
Lai

(10) Patent No.: US 8,720,936 B1
(45) Date of Patent: May 13, 2014

(54) TWIN BABY CARRIAGE

(71) Applicant: Chin-I Lai, Tainan (TW)

(72) Inventor: Chin-I Lai, Tainan (TW)

( * ) Notice: Subject to any disclaimer, the term of this patent is extended or adjusted under 35 U.S.C. 154(b) by 0 days.

(21) Appl. No.: 13/764,487

(22) Filed: Feb. 11, 2013

(51) Int. Cl.
*B62B 7/08* (2006.01)

(52) U.S. Cl.
USPC .......................... 280/642; 280/647; 280/650

(58) Field of Classification Search
USPC .......... 280/642, 644, 647, 649, 650, 657, 658
See application file for complete search history.

(56) References Cited

U.S. PATENT DOCUMENTS

| | | | |
|---|---|---|---|
| 5,718,439 A * | 2/1998 | Wang | 280/47.38 |
| 5,938,230 A * | 8/1999 | Huang et al. | 280/650 |
| 6,431,579 B1 * | 8/2002 | Kaneko et al. | 280/642 |
| 7,632,035 B2 * | 12/2009 | Cheng | 403/98 |
| 8,100,470 B1 * | 1/2012 | Hu | 297/148 |
| 8,157,286 B2 * | 4/2012 | Lai | 280/647 |
| 8,276,935 B2 * | 10/2012 | Minato et al. | 280/647 |
| 8,430,420 B2 * | 4/2013 | Chen et al. | 280/647 |
| 2002/0033588 A1 * | 3/2002 | Kaneko et al. | 280/650 |
| 2005/0167951 A1 * | 8/2005 | Zhen | 280/642 |
| 2010/0001492 A1 * | 1/2010 | Driessen | 280/642 |

\* cited by examiner

*Primary Examiner* — J. Allen Shriver, II
*Assistant Examiner* — Travis Coolman
(74) *Attorney, Agent, or Firm* — Muncy, Geissler, Olds & Lowe, P.C.

(57) ABSTRACT

A twin baby carriage comprises a front bracket, a pair of rear brackets, and a linkage bar set. The front bracket includes a connection hub at a middle section. The front bracket includes a front stretcher extended between two sides thereof. The rear brackets include a rear stretcher extended between two outmost sides thereof. The linkage bar set includes an elongate bar, an upper slide sleeve and a lock control assembly. The elongate bar bridges the connection hub and front stretcher. The upper slide sleeve is coupled on the elongate bar. The lock control assembly is held in the upper slide sleeve and includes a control knob and a pin. The control knob is depressible to drive the pin to insert into a positioning hole on the elongate bar such that the upper slide sleeve and elongate bar are locked to form a fixing state.

4 Claims, 7 Drawing Sheets

TWIN BABY CARRIAGE

FIELD OF THE INVENTION

The present invention relates to a twin baby carriage, in particular to a twin baby carriage having a simple and sturdy structure which is both easily foldable and safety improved.

BACKGROUND OF THE INVENTION

Many families have baby carriages to facilitate carrying of babies during outing. But if a family has two babies or young children, moving two baby carriages during outing is not convenient. Some families would choose to buy a twin baby carriage to take proper care of two children at the same time. The conventional twin baby carriages at present mainly can be divided into two types: one is with a front seat and a rear seat, while another is with a left seat and a right seat. The baby carriage with the front seat and rear seat has a longer carriage body, the child sitting on the front seat is at a longer distance from the parent, hence taking care of the child is more difficult. Moreover, whether the rear seat and front seat are positioned in the same direction or reverse directions, the child sitting on the rear seat whos visual sight must be blocked by the front seat or the parent who moves the baby carriage. As a result, the child sitting on the rear seat can only see external sights from two sides therefrom. It spoils the fun and good intention of outing with the children.

The baby carriage with the left seat and right seat allows childrens to seat abreast. The children have a better view of the sights during outing. But such a baby carriage with a wider carriage body, a bulkier carriage frame and heavier weight is more difficult to maneuver. In the event that the body weights of the children vary a great deal, the gravity center of the baby carriage is affected, thus the parent has to take extra care to maintain the balance of the carriage body to avoid toppling of the baby carriage caused by unbalanced gravity center that might injure the children.

In view of the drawbacks of the aforesaid conventional twin baby carriages, to develop a twin baby carriage with a lighter and nimble carriage body, sturdier structure and safer in use still is a goal worth pursuing in the industry.

SUMMARY OF THE INVENTION

The present invention aims to overcome the disadvantages of the conventional twin baby carriages that are heavy, bulky and not formed with a sturdy structure and the gravity center of which while be seated with children with different weight is proned to be shifted. The primary object of the invention is to provide a twin baby carriage that is simply and sturdily structured, foldable easily and provides enhanced safety.

To achieve the foregoing object the twin baby carriage according to the invention includes a front bracket, a pair of rear brackets, a plurality of wheels and a linkage bar set. The front bracket is formed in a reverse U shape, and has a carriage folding knob at a middle section and a connection hub extended below the carriage folding knob and a front stretcher extended between two inner sides at a lower section thereof. The pair of rear brackets include a rear stretcher extended between two outmost inner sides at lower section thereof. The plurality of wheels are installed on the bottom ends of the front bracket and the pair of rear brackets. The linkage bar set includes a elongate bar, a lower slide sleeve, an upper slide sleeve and a lock control assembly. The elongate bar including an upper end fastened to the connection hub and a lower end fastened to a middle section of the front stretcher. The lower slide sleeve and upper slide sleeve are slidably coupled on the elongate and bridged by a short bar which is parallel with and located below the elongate bar at a fixed distance. The upper slide sleeve includings a lower end hinged on an upright bar which includes a lower end fastened to the rear stretcher. The lock control assembly being held in the upper slide sleeve and including a control knob and a pin. The control knob being depressible to drive the pin to insert into a positioning hole formed on the elongate bar such that the upper slide sleeve and the elongate bar are locked to form a fixing state.

In addition, the control knob includes a holding cavity and a side hole transversely running through the holding cavity. The side hole includes an inclined surface. The pin is held in the holding cavity and retained between the side hole and holding cavity through an axle. The pin includes a distal end coupled with an elastic element. When the control knob is pressed the elastic element is stretched to push the pin upwards so that the axle is moved along the inclined surface to drive the pin jutting outwards from the holding cavity.

Furthermore, the two inner sides of the front bracket and two sides of the lower slide sleeve respectively including a plurality of holding members located thereon for holding a seat or a baby basket. The left side and right side of the elongate bar includes separate child seat respectively in an abreast manner.

In short, the invention provides many advantages, notably: through the linkage bar set, the stability and sturdiness of the carriage body of the twin baby carriage is enhanced while the carriage body also can be made lighter and nimbler. Through the lock control assembly, users can lock or unlock the twin baby carriage easily and quickly thus improves folding convenience and safety.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
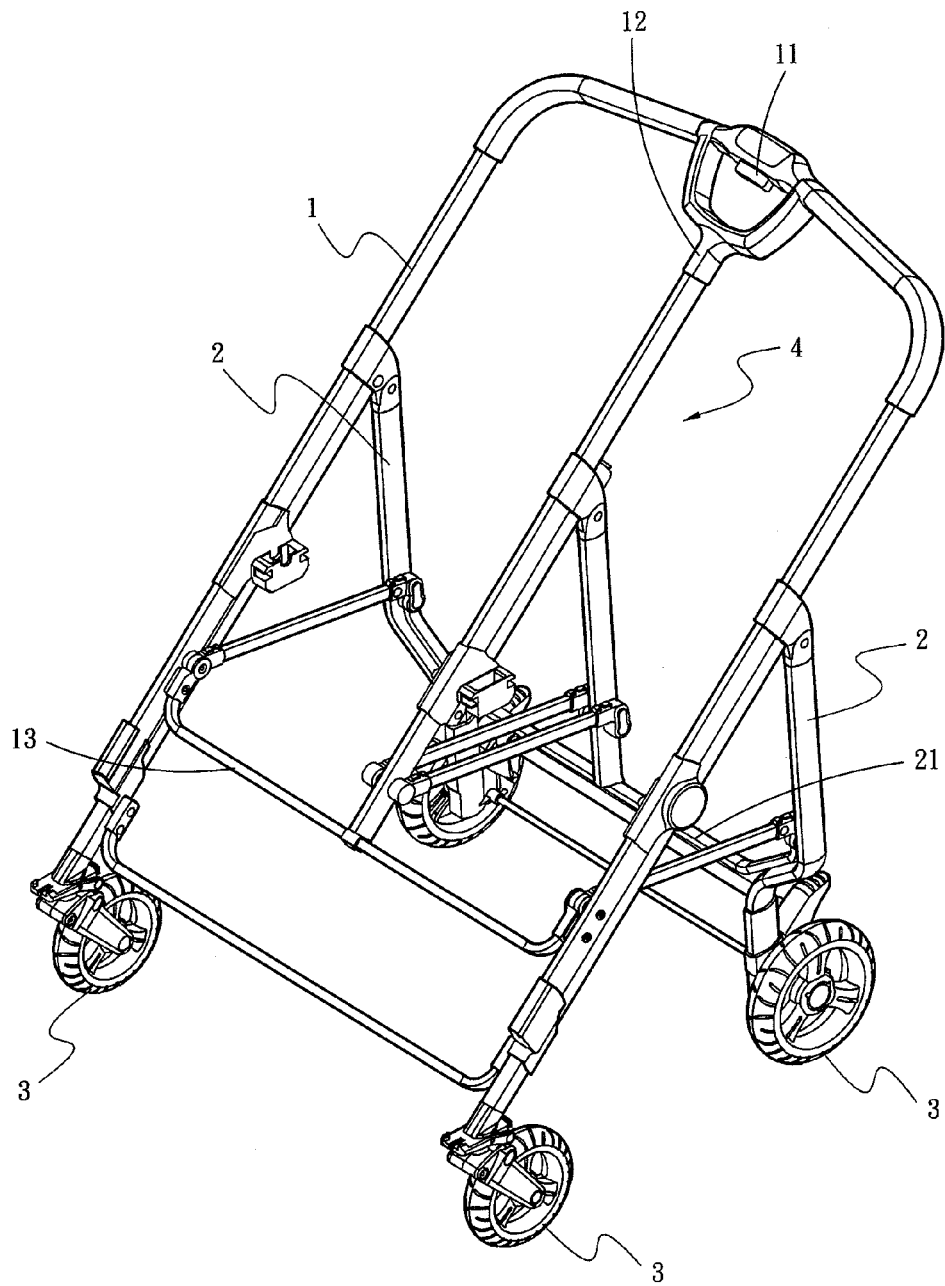
FIG. 1 is a perspective view of the invention.
Figure 2:
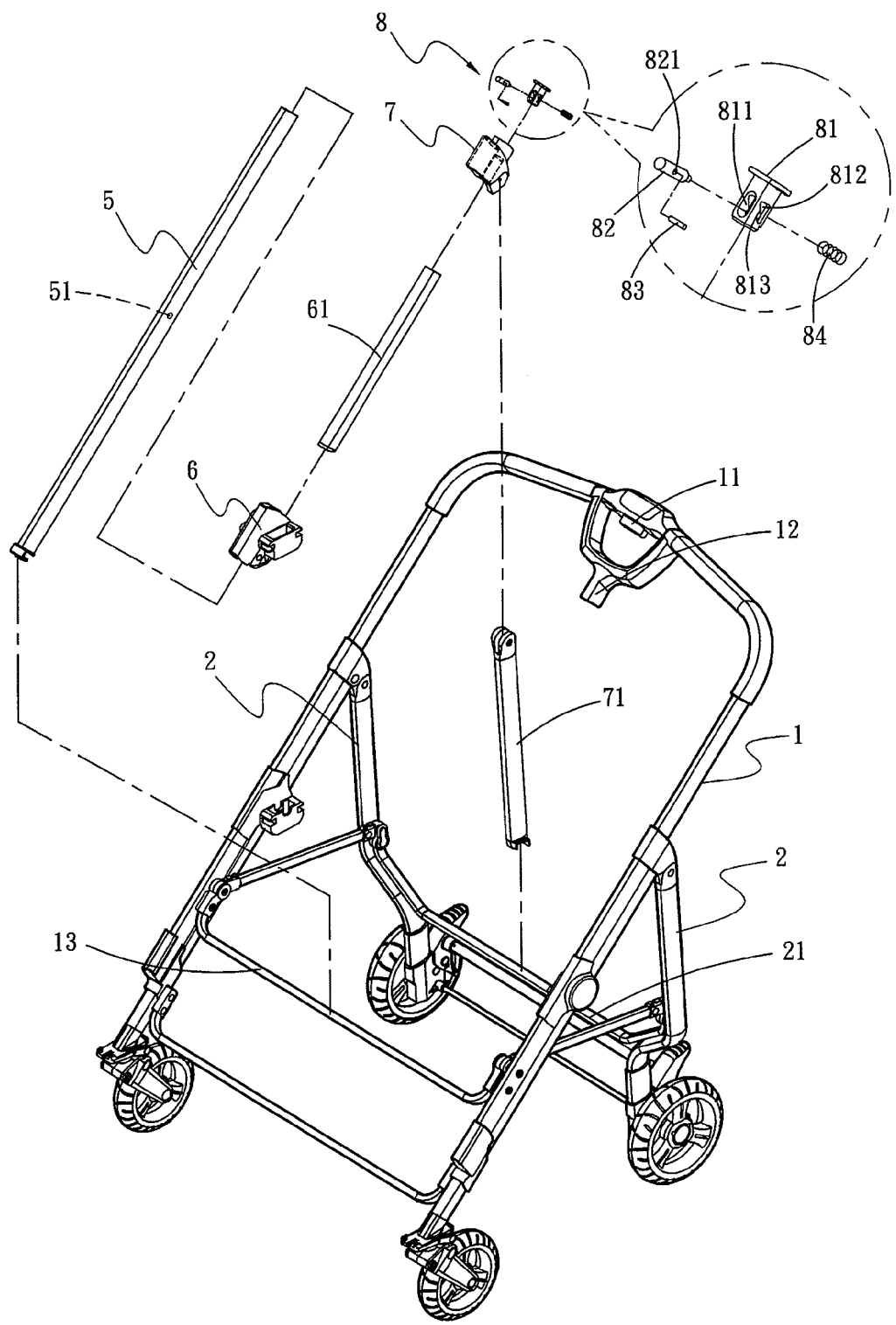
FIG. 2 is an exploded view of the invention.
Figure 3:
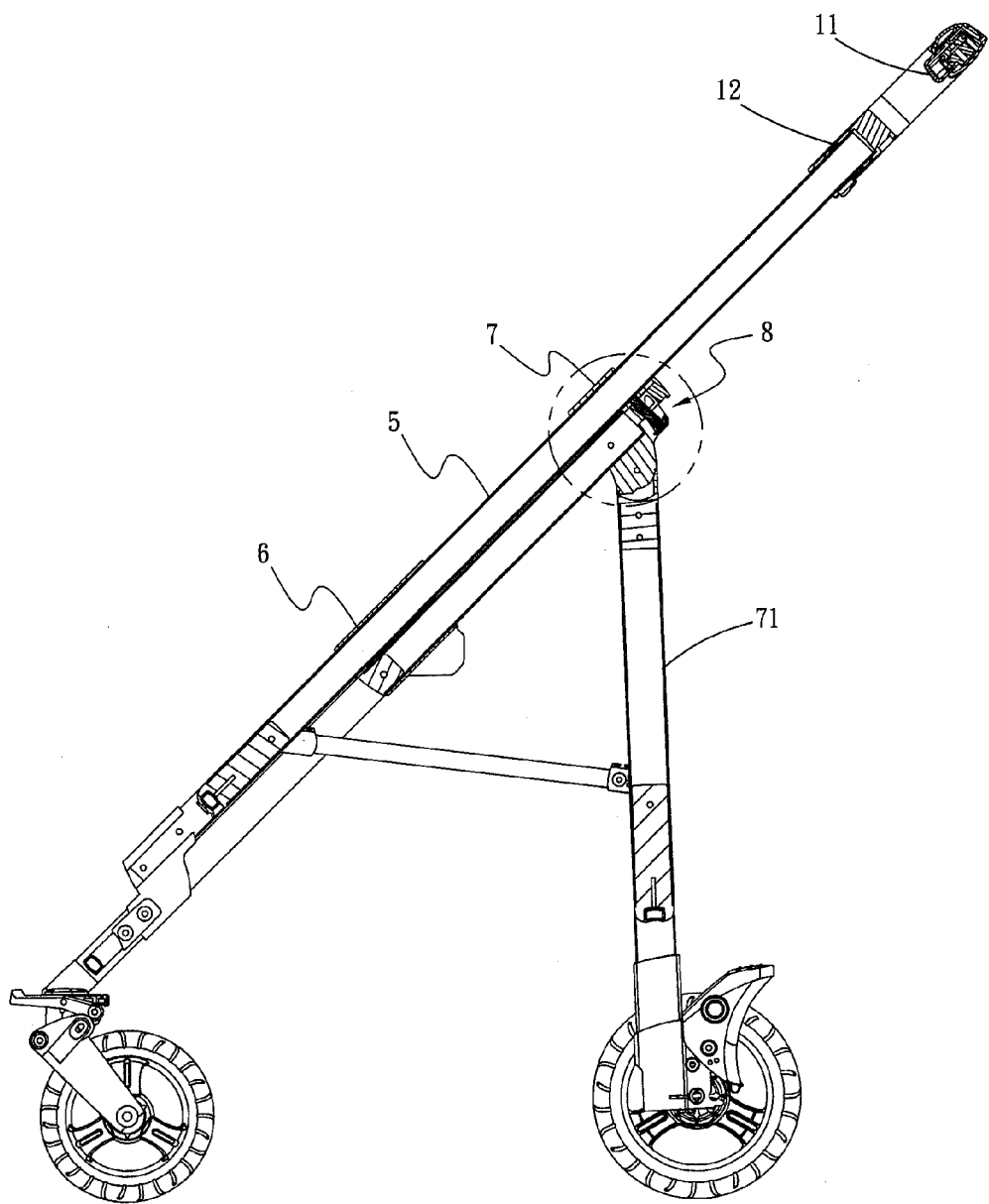
FIG. 3 is a sectional view of an embodiment of the invention.

Please referring to FIGS. 1 through 3, the present invention aims to provide a twin baby carriage which comprises a front bracket 1, a pair of rear brackets 2, a plurality of wheels 3 and a linkage bar set 4. The front bracket 1 is formed in a reverse U shape, and has a carriage folding knob 11 at a middle section thereof, a connection hub 12 extended below the carriage folding knob 11 and a front stretcher 13 extended between two inner sides at a lower section thereof. The pair of rear brackets 2 including a rear stretcher 21 extended between two outmost inner sides at lower sections thereof. The plurality of wheels 3 are installed on the bottom ends of the front bracket 1 and the pair rear brackets 2. The linkage bar set 4 includes a elongate bar 5, a lower slide sleeve 6, an upper slide sleeve 7 and a lock control assembly 8. The elongate bar 5 including an upper end fastened to the connection hub 12 and a lower end fastened to a middle section of the front stretcher 13. The lower slide sleeve 6 and upper slide sleeve 7 are slidably coupled on the elongate bar 5 and bridged by a short bar 61 which is parallel with and located below the elongate bar to form a fixed distance from each other. The upper slide sleeve 7 includes a lower end hinged on an upright bar 71 which is turnable against the upper slide sleeve 7 and a lower end fastened to the rear stretcher 21. The lock control assembly 8 includes at least a control knob 81 and a pin 82. The control knob 81 is depressible to drive the pin 82 to insert into a positioning hole 51 formed on the elongate bar 5 such that the upper slide sleeve 7 and the elongate bar 5 are locked to form a fixing state.

Figure 4:
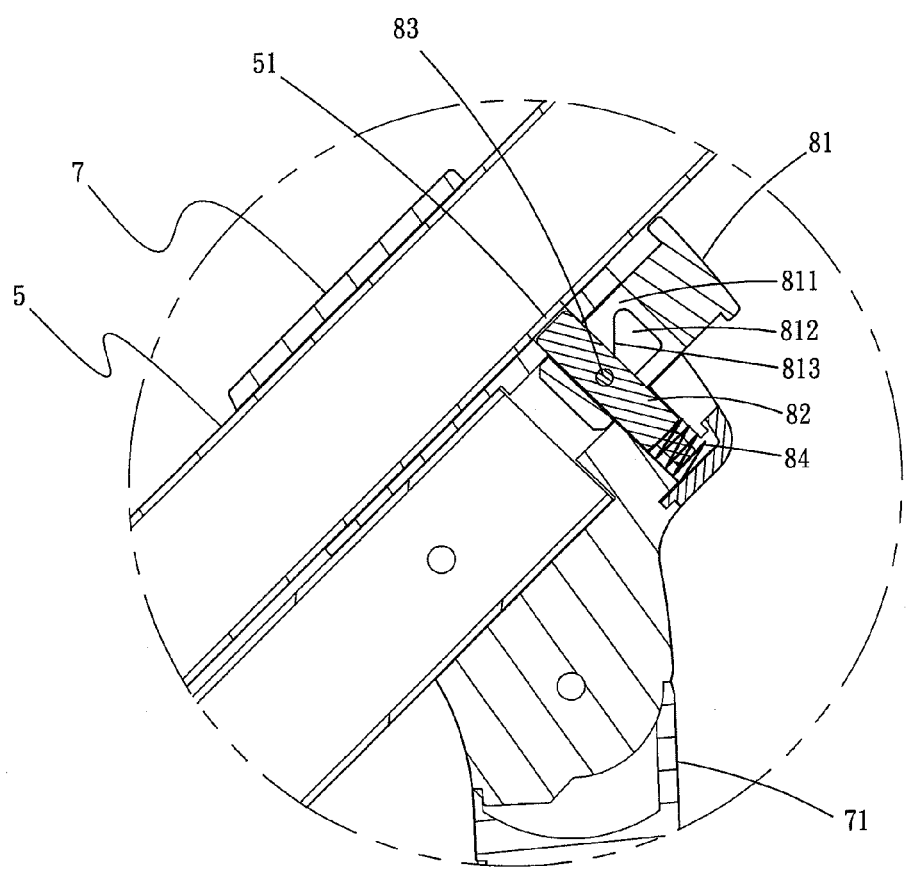
FIG. 4 is a fragmentary enlarged view according to FIG. 3.
Figure 5:
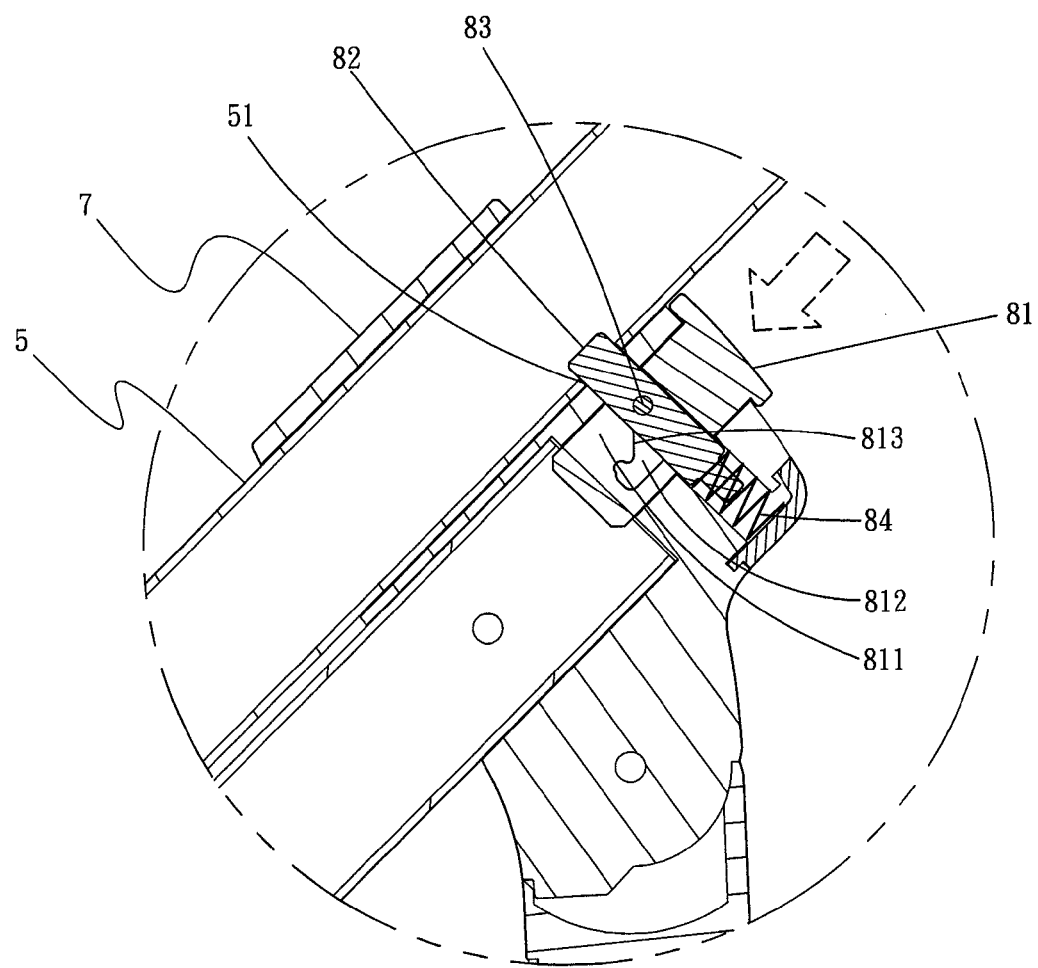
FIG. 5 is a schematic view showing an operating condition for locking according to FIG. 4.

Please also refer to FIGS. 3 through 5 for an preferred embodiment of the invention in action for locking or unlocking through the linkage bar set 4. The control knob 81 includes a holding cavity 811 and a side hole 812 transversely running through the holding cavity 811. The side hole 812 includes an inclined surface 813. The pin 82 is held in the holding cavity 811 and includes a through hole 821 run through by an axle 83 which retains the pin 82 between the holding cavity 811 and side hole 812. The pin 82 includes a distal end coupled with an elastic element 84 which can be a spring. When the control knob 81 is pressed, the elastic element 84 is stretched to push the pin 82 upwards so that the axle 83 is moved on the inclined surface 813 to drive the pin 82 jutting outwards from the holding cavity 811 to be inserted into the positioning hole 51 of the elongate bar 5, thereby the upper slide sleeve 7 and elongate bar 5 are locked to form a locking state.

While the upper slide sleeve 7 and elongate bar 5 are combined in a locking state, the upper slide sleeve 7 cannot slide along the elongate bar 5 and the carriage body can held in a firmly expanded state. If users want to fold the carriage body, what they need is just to pull the control knob 81 and the inclined surface 813 of the side hole 812 will push the axle 83 move to drive the pin 82 to disengage the positioning hole 51 of the elongate bar 5 to release the locking state and the carriage body can be retracted and folded smoothly and easily with great convenience.

Figure 6:
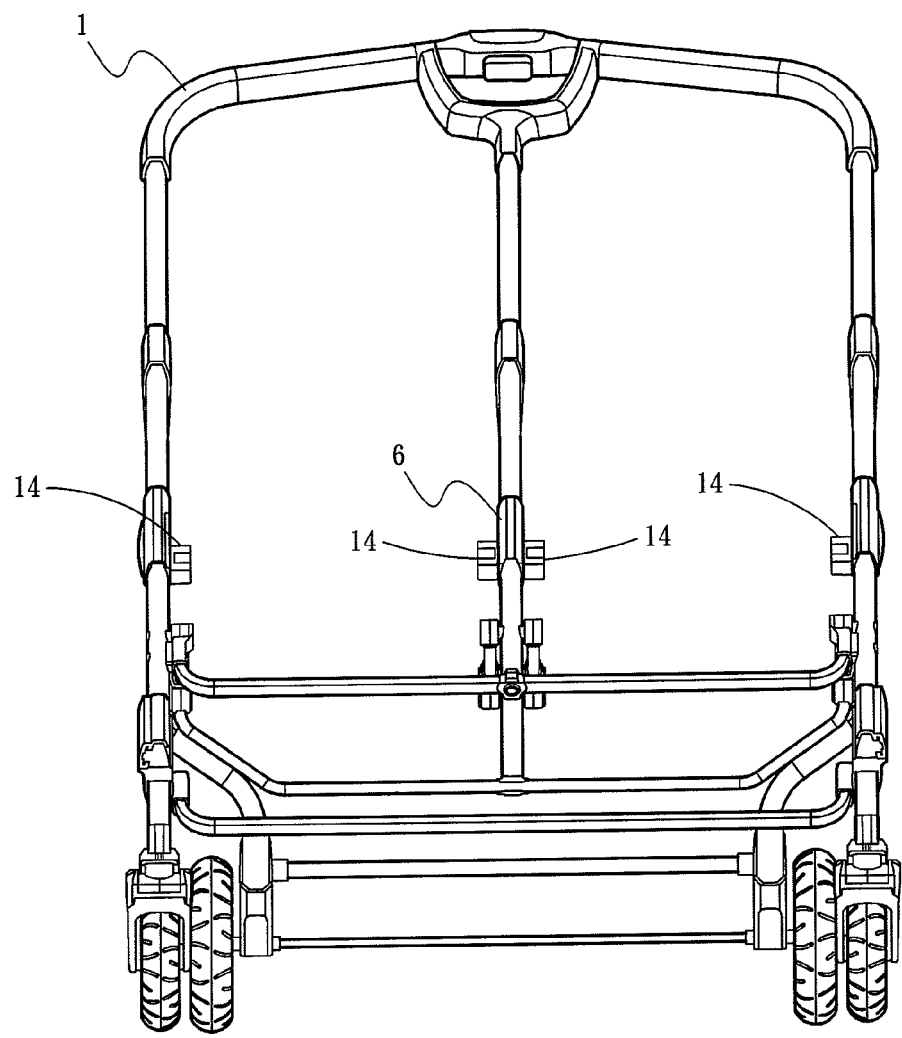
FIG. 6 is a front view of the invention.
Figure 7:
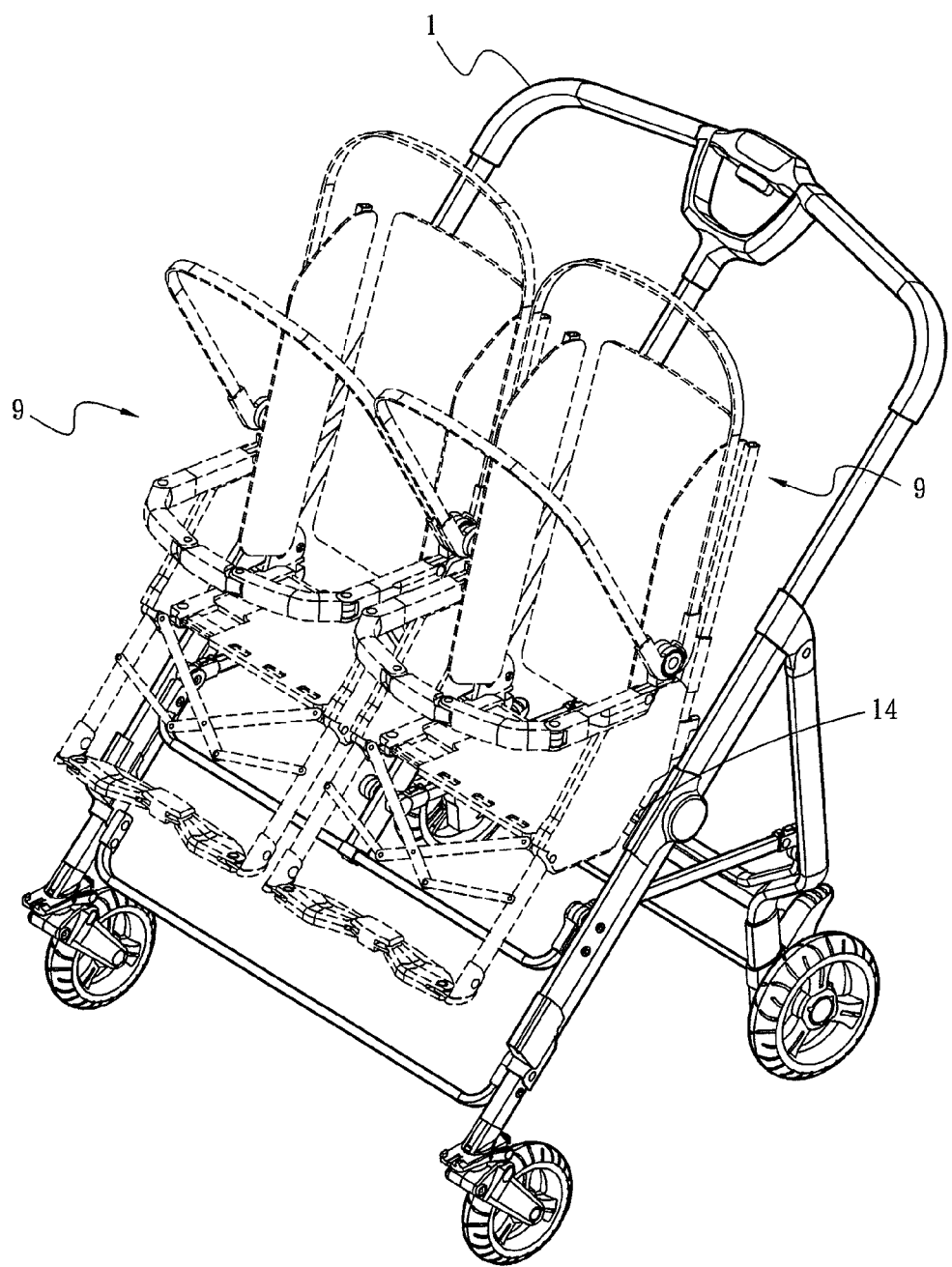
FIG. 7 is a schematic view of the invention in a use condition.

Please referring to FIGS. 6 and 7, when the invention is in use, the two inner sides of the front bracket 1 and two sides of the lower slide sleeve 6 have respectively a plurality of holding members 14 located thereon for holding a seat or a baby basket (not shown in the drawings). The left side and right side of the elongate bar 5 separate the child seats in an abreast manner. By means of the structure set forth above, the gravity center of the carriage body maintains at a stable state to improve the safety in use.

While the preferred embodiment of the invention has been set forth for the purpose of disclosure, it is not the limitation of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A twin baby carriage, comprising:
a front bracket including a carriage folding button at a middle section thereof, a connection hub extended below the carriage folding button and a front stretcher extended between two inner sides at a lower section thereof;
a pair of rear brackets including a rear stretcher extended between two outmost inner sides at lower sections thereof;
a plurality of wheels installed on bottom ends of the front bracket and the pair of rear brackets; and
a linkage bar set including an elongate bar, a lower slide sleeve, an upper slide sleeve and a lock control assembly; the elongate bar including an upper end fastened to the connection hub and a lower end fastened to a middle section of the front stretcher, the lower slide sleeve and the upper slide sleeve being coupled on the elongate bar and bridged by a short bar which is parallel with and located below the elongate bar, the upper slide sleeve including a lower end hinged on an upright bar which includes a lower end fastened to the rear stretcher; the lock control assembly being held in the upper slide sleeve and including a control button and a pin; the control button being depressible to drive the pin to insert into a positioning hole formed on the elongate bar such that the upper slide sleeve and the elongate bar are locked to form a fixing state.

2. The twin baby carriage of claim 1, wherein the control button includes a holding cavity and a side hole transversely running through the holding cavity, the side hole including an inclined surface, the pin being held in the holding cavity and including a through hole run through by an axle, the pin including a distal end coupled with an elastic element.

3. The twin baby carriage of claim 2 further including a plurality of holding members on the two inner sides of the front bracket and two sides of the lower slide sleeve for holding a seat or a baby basket.

4. The twin baby carriage of claim 1 further including a plurality of holding members on the two inner sides of the front bracket and two sides of the lower slide sleeve for holding a seat or a baby basket.

\* \* \* \* \*